Sept. 4, 1934.  C. C. FARMER  1,972,733
FLUID PRESSURE BRAKE
Filed Feb. 18, 1933  2 Sheets-Sheet 1
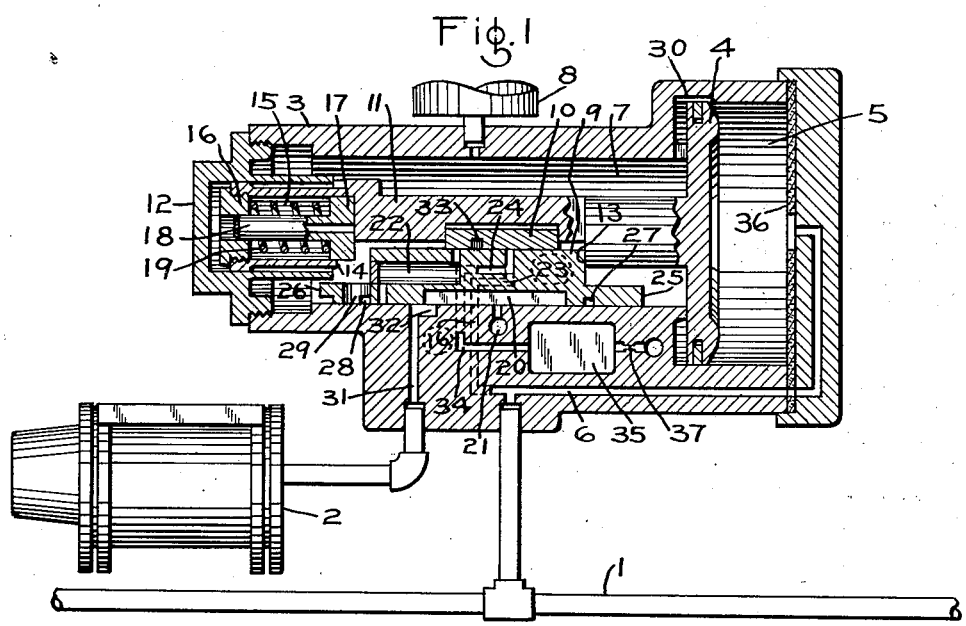
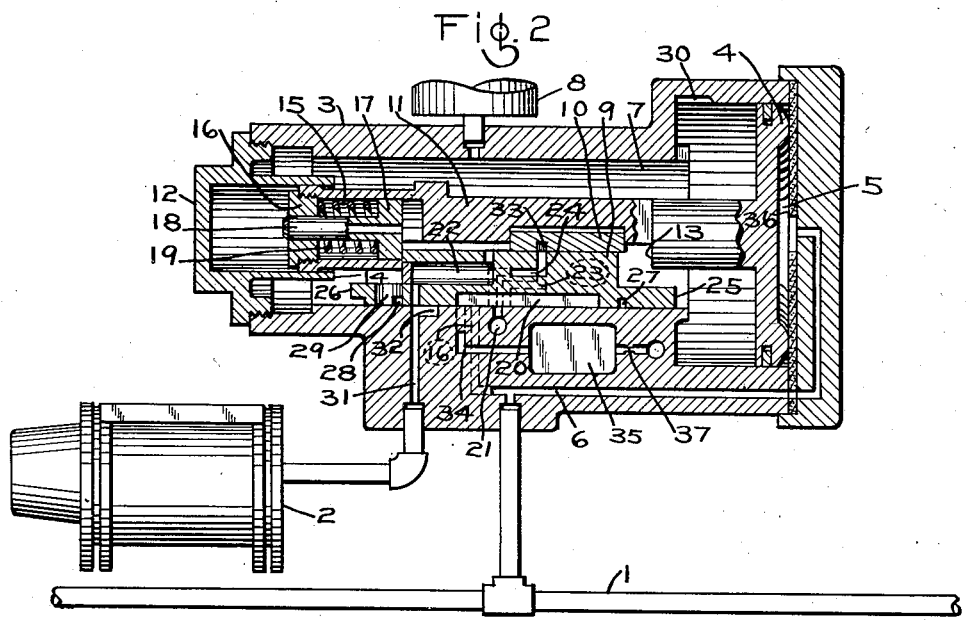
INVENTOR
CLYDE C. FARMER
BY Wm. M. Cady
ATTORNEY Sept. 4, 1934.                C. C. FARMER                1,972,733
                          FLUID PRESSURE BRAKE
                          Filed Feb. 18, 1933          2 Sheets-Sheet 2
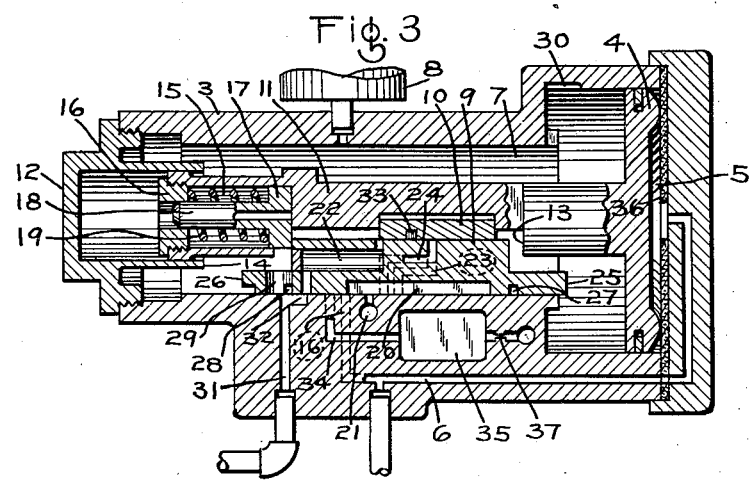
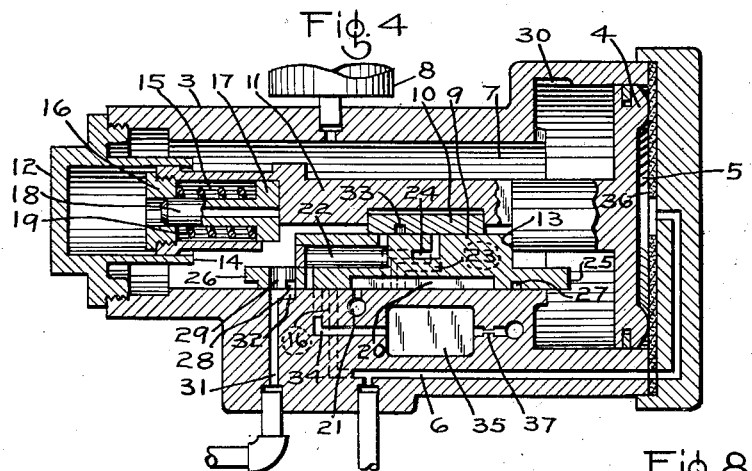
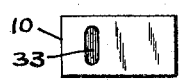
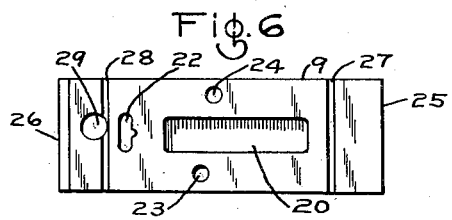
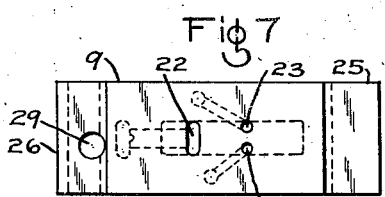
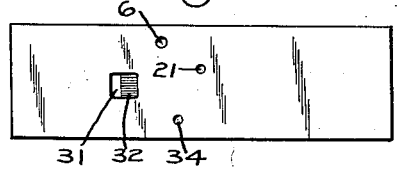
INVENTOR
CLYDE C. FARMER
BY  *Wm. M. Cady*
                ATTORNEY Patented Sept. 4, 1934

1,972,733

UNITED STATES PATENT OFFICE 1,972,733

FLUID PRESSURE BRAKE

Clyde C. Farmer, Pittsburgh, Pa., assignor to The Westinghouse Air Brake Company, Wilmerding, Pa., a corporation of Pennsylvania Application February 18, 1933, Serial No. 657,392

8 Claims. (Cl. 303—41)

This invention relates to fluid pressure brakes and more particularly to the type adapted to operate upon a reduction in brake pipe pressure to effect an application of the brakes.

As disclosed in the pending application of Clyde C. Farmer, Serial No. 612,465, filed May 20, 1932, it has heretofore been proposed to provide a brake application valve device having a brake application position in which a service port through the main slide valve is uncovered by the auxiliary slide valve, so that fluid under pressure may flow to the brake cylinder to apply the brakes. In this brake application valve device, a spring is carried in the end of the piston stem and is adapted to engage the end of the main slide valve and be compressed when said slide valve is moved to the brake application position.

Particularly in effecting an emergency application of the brakes, the movement of the parts of a brake application valve device to the brake application position is rapid, and under certain conditions, such as low friction of a slide valve on its seat, the inertia of the slide valve may cause the slide valve to overtravel the application position, and in a device of the above character the compressive force of the spring in the piston stem acting on the main slide valve, also tends to cause the main slide valve to overtravel.

In the device disclosed in the above mentioned pending application, the application position is defined by engagement of the actuating piston with the end wall of the chamber containing said piston, so that any overtravel movement of the main slide valve is relative to the piston and the auxiliary slide valve, and this results in lapping of the service port through the main slide valve so that the supply of fluid under pressure to the brake cylinder is cut off, thus preventing the brakes from being applied with the degree of force intended.

One object of my invention is to obviate the above difficulty by providing through the main slide valve, in addition to the usual brake cylinder supply port, another port which is not controlled by the auxiliary slide valve and which is so arranged with respect to the usual brake cylinder supply port and brake cylinder passage in the slide valve seat, that regardless of overtravel of the main slide valve beyond the usual brake applying position, fluid under pressure will be supplied to the brake cylinder passage and from thence to the brake cylinder.

The pressure with which a slide valve is pressed against its seat by fluid under pressure in the chamber containing the slide valve is governed primarily by the area of the seating face of the slide valve which is exposed to a pressure lower than the pressure in the valve chamber, such for example as atmospheric pressure.

With as perfect a sliding fit as it is practicable to obtain between a slide valve and its seat, the area of the seating face of the slide valve exposed to low pressure may not be confined to the actual cavities or recesses which are open to low pressure, for the reasons that by seepage or otherwise, fluid under pressure may leak from between the slide valve and seat over certain areas, to the low pressure cavities or recesses and thus increase the area of the slide valve which is subject to low pressure, to a degree such that the slide valve will be pressed against its seat with such force as to cause rapid wear or scoring and cutting of the slide valve seating face and the slide valve seat.

Another object of my invention is to overcome this difficulty by providing means for preventing desired areas of the slide valve from becoming exposed to the low fluid pressure which may be acting on other areas of the seating face of the slide valve.

In order to obtain this last mentioned object, the slide valve is provided, preferably at both the front and rear ends, with an extension or lug, and a groove is cut transversely across the full seating face of the slide valve adjacent the inner end of the lugs, so as to prevent low pressure which may be acting on the slide valve seating face between the transverse grooves from becoming effective beneath the lugs.

Other objects and advantages will be apparent from the following more detailed description of the invention.

In the accompanying drawings; Fig. 1 is a diagrammatic view, mainly in section, of a fluid pressure brake equipment including a brake application valve device embodying the invention and with the parts shown in release position; Fig. 2 is a diagrammatic view of the fluid pressure brake equipment shown in Fig. 1, with the parts of the brake application valve device shown in application position; Fig. 3 is a diagrammatic view of the brake controlling valve device shown in Fig. 2, but with the main slide valve shown in an overtravel position instead of the usual application position; Fig. 4 is a diagrammatic view of the brake controlling valve device shown in Fig. 2, but with the main slide valve shown in maximum overtravel position; Fig. 5 is a plan view of the seat of the main slide valve of the brake application valve device shown in Fig. 1; Fig. 6 is a plan view of the seating face of the main slide valve of the brake application valve device shown in Fig. 1; Fig. 7 is a plan view of the face of the main slide valve opposite the seating face, and showing the seat for the auxiliary slide valve; and Fig. 8 is a plan view of the seating face of the auxiliary slide valve.

As shown in the drawing, the fluid pressure brake equipment comprises a brake controlling valve device which is responsive to variations in pressure in brake pipe 1 for controlling the supply and release of fluid under pressure to and from a brake cylinder 2.

The brake controlling valve device comprises a casing 3 containing a piston 4 having at one side a chamber 5 which is open through a passage 6 to brake pipe 1, and having at the opposite side a valve chamber 7 in constant communication with a source of fluid under pressure, such as an auxiliary reservoir 8. Contained in the valve chamber 7 is a main slide valve 9 and an auxiliary slide valve 10 adapted to be operated by the piston 4.

For operating the slide valves 9 and 10, the piston 4 is provided with a stem 11, the end portion of which is slidably carried in a suitable bore provided in a cap nut 12 having screw-threaded engagement with the casing 3 for closing the outer end of the valve chamber 7.

The piston stem 11 is provided with a recess in which the auxiliary slide valve 10 is operatively disposed. Said stem is also provided, adjacent the piston 4, with a shoulder 13 adapted to engage the front end of the main slide valve 9 for moving said slide valve inwardly or toward the left hand, and is provided, adjacent the rear or outer end, with a shoulder 14 adapted to engage the rear end of said slide valve for moving said slide valve outwardly.

The rear end portion of the piston stem 11 is provided with a chamber 15, the rear end of which is closed by an apertured plug 16 having screw-threaded connection with said stem. The front end of chamber 15 is open at its under side to the valve chamber 7. A plunger 17 is slidably mounted in the chamber 15 and the outer or right hand end wall of the chamber 15 provides a stop shoulder to limit outward movement of said plunger. The plunger 17 is provided with a stem 18 slidably guided within a bore of the plug 16. A spring 19, contained in chamber 15 and surrounding the stem 18, is interposed between one side of the plunger 17 and plug 16 and acts to normally maintain said plunger in engagement with the end wall of said chamber. In this position, the face of the plunger, which is adapted to engage the rear end of the main slide-valve, is closer to the end of said slide valve than the shoulder 14 of the piston stem, so that in effecting an application of the brakes the plunger 17 will engage the end of said slide valve and yieldably resist relative movement of the piston and auxiliary slide valve 10 before the shoulder 14 on the piston stem engages the end of said main slide valve.

The main slide valve 9 is provided with the usual release cavity 20, which is at all times in communication with an atmospheric passage 21, and is also provided with the usual service or brake application port 22 controlled by the auxiliary slide valve 10, and two quick service ports 23 and 24 which are also controlled by the auxiliary slide valve 10.

The main slide valve 9 is also provided with two extensions or lugs 25 and 26, each lug providing an extended seating face in sliding engagement with the slide valve seat, the lug 25 preferably extending forwardly from the front end of said slide valve, while the lug 26 preferably extends rearwardly from the rear end of said slide valve. The seating face of the main slide valve 9 and the seating face of the lug 25 are separated by a groove 27 extending transversely across the full seating face of the valve, and a similar groove 28 separates the seating face of the lug 26 from that of the slide valve. Adjacent the rear end of the slide valve 9 and extending through the lug 26 is an overtravel brake application port 29, the purpose of which will be hereinafter described.

In operation, fluid under pressure supplied to the brake pipe 1 in the usual manner flows from the brake pipe through passage 6 to the seat of the main slide valve 9 and to the piston chamber 5. With the brake application valve parts in the usual release position, indicated in Fig. 1, fluid under pressure flows from piston chamber 5 through a feed groove 30 to valve chamber 7 and from thence to the fluid pressure supply reservoir 8, thereby charging said chamber and reservoir to brake pipe pressure. With the main slide valve 9 in release position, the brake cylinder 2 is vented through pipe and passage 31 by way of a cavity extension 32 of the passage 31 in the slide valve seat, cavity 20 in said slide valve and from thence through the atmospheric passage 21.

To effect an application of the brakes, a reduction in brake pipe pressure is effected in the usual manner, and fluid under pressure is then vented from piston chamber 5. Upon a predetermined, but light, reduction in pressure in piston chamber 5, the pressure of fluid in valve chamber 7 moves the piston 4 and thereby the auxiliary slide valve 10 outwardly. The initial outward movement of piston 4 is adapted to close the feed groove 30 so as to prevent back flow of fluid under pressure from valve chamber 7 to piston chamber 5 and from thence to the brake pipe.

The distance provided between the rear end of the main slide valve 9 and the front face of plunger 17 is such that as soon as the feed groove 30 is closed, said plunger engages the end of said slide valve to resist further outward movement of the piston 4 and auxiliary slide valve 10 until the brake pipe pressure has been further reduced a predetermined degree, at which time the piston 4 acts to compress said spring and move the auxiliary slide valve 10 to quick service position, which is defined by engagement of shoulder 14 on the piston stem with the rear end of the main slide valve 9.

In quick service position, the application port 22 in the main slide valve 9 is uncovered by the auxiliary slide valve 10 and a quick service cavity 33 in the auxiliary slide valve connects the two quick service ports 23 and 24 in the main slide valve 9. With the main slide valve 9 still in release position, port 23 registers with the brake pipe passage 6 in the slide valve seat, while port 24 registers with a passage 34 leading to a quick service reservoir 35, so that in quick service position fluid under pressure is adapted to flow from the brake pipe 1 to the quick service reservoir 35.

The reduction in brake pipe pressure effected by the substantial equalization of pressures in the brake pipe 1 and the quick service reservoir 35 is adapted to serially propagate quick service action through a train in the usual well known manner, and is also ordinarily sufficient to cause the pressure in valve chamber 7 to promptly move the piston 4, and thereby the main slide valve 9, outwardly to application position, which is defined by engagement of said piston with the gasket 36, as indicated in Fig. 2.

If the quick service reduction in brake pipe pressure effected in the manner above described, is not sufficient to move the piston 4 and main slide valve 9 to application position, fluid under pressure continues to flow from the brake pipe to the quick service reservoir 35 and from thence through a restricted atmospheric vent passage 37 until the brake pipe pressure is reduced sufficiently to cause said piston and slide valve to be moved to the application position.

With the main slide valve 9 in application position, the quick service passages 6 and 34 in the slide valve seat are lapped by the main slide valve 9, so as to prevent further venting of fluid under pressure from the brake pipe to the quick service reservoir 35, and the service or brake application port 22, through said slide valve, registers with the brake cylinder cavity 32 in the slide valve seat, and since port 22 is uncovered by the auxiliary slide valve 10, fluid under pressure is permitted to flow from valve chamber 7 and the connected fluid pressure supply reservoir 8 through port 22, cavity 32 and from thence through passage 31 to the brake cylinder 2, thereby applying the brakes.

Under certain conditions, such as in effecting an emergency application of the brakes, the movement of the piston 4, main slide valve 9 and auxiliary slide valve 10 to application position may be so rapid, that the main slide valve 9 may, due to its inertia and the pressure of spring 19 acting through the plunger 17 on said slide valve, overtravel and move beyond the application position indicated in Fig. 2.

All overtravel of main slide valve 9 is relative to the auxiliary slide valve 10 and the piston 4, after the piston 4 has moved into engagement with the gasket 36.

If the main slide valve 9 overtravels only until the plunger 17 engages the end wall of chamber 15, at which position the pressure of spring 19 is prevented from causing the further movement of said slide valve, then said slide valve will assume the position indicated in Fig. 3, in which position the application port 22 is still partly uncovered by graduating valve 10 and is still in partial registry with cavity 32 in the slide valve seat, so that fluid under pressure may still flow to the brake cylinder as hereinbefore described. The port 29 also partly registers with cavity 32, so that fluid under pressure may also flow from valve chamber 7 directly through port 29 to cavity 32 and from thence to the brake cylinder 2.

If the main slide valve 9 does not cease moving in the overtravel position, indicated in Fig. 2, but instead continues to move forwardly, the usual application port 22 will be gradually closed by the auxiliary slide valve 10 and also will gradually move out of registry with cavity 32, but as this is occurring, the additional supply port 29 through the lug 26 opens more fully to cavity 32, so as to increase the flow of fluid under pressure through said port to the brake cylinder.

The maximum overtravel position of main slide valve 9 is defined by engagement of the front end of said slide valve with shoulder 13 on the piston stem 11. In this position, which is shown in Fig. 4, the additional supply port 29 is in full registry with cavity 32 in the slide valve seat, so that fluid under pressure may continue to flow to the brake cylinder, but it will be noted that the usual supply port 22 is lapped at one end by the auxiliary slide valve 10 and the other end is closed off at the slide valve seat.

It will be evident from the above description, that regardless of the degree of overtravel of the main slide valve 9, fluid under pressure will continue to be supplied to the brake cylinder.

In order to effect a release of the brakes after an application, the pressure in brake pipe 1, and thereby in piston chamber 5, is increased in the usual manner and operates the piston 4 to move the main slide valve 9 and auxiliary slide valve 10 to release position. In release position of piston 4, fluid under pressure flows from chamber 5 through the feed groove 30 to valve chamber 7 and from thence to the auxiliary reservoir 8, thereby charging said chamber and auxiliary reservoir to brake pipe pressure. In release position of the main slide valve 9, the release cavity 20 in the slide valve connects the seat cavity 32, to which the brake cylinder 2 is at all times open, to the exhaust passage 21, so that fluid under pressure is released from the brake cylinder to effect a release of the brakes.

In order to stop movement of the piston 4 and auxiliary slide valve 10 in the quick service position in effecting an application of the brakes, as hereinbefore described, the main slide valve 9 is adapted to offer a resistance to movement which is governed primarily by the pressure with which said slide valve 9 is pressed into engagement with its seat. The seating pressure of the main slide valve 9 is theoretically, substantially equal to the pressure of fluid acting in valve chamber 7 times the area of the release cavity 20 in the seating face of said slide valve, which cavity is at all times open to the atmosphere through the exhaust passage 21. In case there are spaces or areas of surface between the main slide valve 9 and its seat which are open to the exhaust cavity 20, then the pressure with which said slide valve is pressed into engagement with its seat will exceed the theoretical amount by a degree which cannot be accurately calculated. According to my invention, the pressure of the main slide valve 9 against its seat per unit of area is limited, however, to a degree which will prevent undue wear or scoring of the slide valve and seat, by isolating the seating surface of the slide valve lugs 25 and 26 from the seating surface of the slide valve proper by means of the transverse grooves 27 and 28, so that atmospheric or any other pressure lower than that in the valve chamber 7 cannot become effective between the seating surface of said lugs and the slide valve seat.

On account of the lug 26 being preferably associated with the rear end of the slide valve 9, as indicated in the drawings, it will be evident that in order to provide a communication to supply fluid under pressure to the brake cylinder in the overtravel positions of the main slide valve 9, as hereinbefore described, said communication must be provided through said lug.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, and a source of fluid under pressure, of valve means movable to a position for establishing communication through which fluid under pressure is supplied from said source to the brake cylinder, a movable abutment operated upon a reduction in brake pipe pressure for moving said valve means to said position, said valve means including a slide valve movable relatively to said movable abutment, a spring carried by said abutment and adapted to be compressed against said slide valve when said slide valve is moved by said abutment, and means for maintaining communication through which fluid under pressure is supplied from said source to said brake cylinder upon such relative movement of said slide valve.

2. In a fluid pressure brake, the combination with a brake pipe, a brake cylinder, and a source of fluid under pressure, of a movable abutment movable its full traverse upon a reduction in brake pipe pressure, a main slide valve having a through port and movable by said abutment, upon full traverse thereof, to a position in which fluid under pressure is supplied from said source through said port to said brake cylinder, said main slide valve being movable relatively to said piston beyond said position, an auxiliary slide valve movable with said abutment and operative to close communication through said port upon such relative movement, and another through port in said main slide valve operative to establish another communication through which fluid under pressure is supplied from said source to said brake cylinder, as the first mentioned communication is closed by said auxiliary slide valve.

3. In a fluid pressure brake, the combination with a brake pipe, a brake cylinder, and a source of fluid under pressure, of a main slide valve having a through port and movable to a position in which fluid under pressure is supplied from said source through said port to said brake cylinder, an auxiliary slide valve normally lapping said port and movable relatively to said main slide valve to uncover said port, a movable abutment operated upon a reduction in brake pipe pressure to first move said auxiliary slide valve relatively to said main slide valve and then move said main slide valve to said position, a spring carried by said abutment and adapted to be compressed against said main slide valve upon the relative movement of said auxiliary slide valve, said main slide valve being movable relatively to said piston and auxiliary slide valve beyond said position and having another through port through which fluid under pressure is adapted to be supplied from said source to said brake cylinder upon such relative movement.

4. The combination with a source of fluid under pressure and a fluid pressure operated valve device comprising a casing having a valve chamber communicating with said source of fluid under pressure, and having a slide valve seat in said valve chamber, a slide valve mounted on said seat and having a cavity subject to fluid at a lower pressure than that in said chamber, and a groove separating a portion of the seating face of said slide valve from the portion containing said cavity, said groove being at all times open to said valve chamber.

5. The combination with a source of fluid under pressure and a fluid pressure operated valve device comprising a casing having a valve chamber communicating with said source of fluid under pressure, and having a slide valve seat in said valve chamber, a slide valve mounted on said seat and having a cavity subject to fluid at a lower pressure than that in said chamber, and a groove at all times open to the valve chamber for surrounding a certain area of the valve seat with fluid under pressure from said valve chamber to isolate said area from the portion of the valve seat open to said cavity.

6. The combination with a source of fluid under pressure and a fluid pressure operated valve device comprising a casing having a valve chamber communicating with said source of fluid under pressure, and having a slide valve seat in said valve chamber, a slide valve mounted on said seat and having a cavity subject to fluid at a lower pressure than that in said chamber, a groove across the full seating face of said slide valve and open at opposite ends to said valve chamber for separating a portion of the seating face of said slide valve from the portion containing said cavity.

7. The combination with a source of fluid under pressure and a fluid pressure operated valve device comprising a casing having a valve chamber communicating with said source of fluid under pressure, and having a slide valve seat in said valve chamber, a slide valve mounted on said seat and having a cavity subject to fluid at a lower pressure than that in said chamber, a transverse groove open to said valve chamber and separating a portion of the seating face of said slide valve, at one end of said slide valve, from the portion containing said cavity, and another transverse groove open to said valve chamber and separating a portion of the seating face of said slide valve, at the opposite end of said slide valve, from the portion containing said cavity.

8. In a fluid pressure brake, the combination with a brake pipe, a source of fluid under pressure, and a brake cylinder, of a casing having a valve chamber open to said source of fluid under pressure and a piston chamber open to said brake pipe and having in said valve chamber a slide valve seat, a passageway connected to said brake cylinder and leading to said slide valve seat, a main slide valve mounted on said seat and having a release position and a cavity adapted in said position to connect said passageway to an atmospheric opening, said main slide valve being movable from release position to an application position and having a through port adapted in application position to register with said passageway, an auxiliary slide valve mounted on said main slide valve and movable relatively to said main slide valve to open said through port to said valve chamber, a piston operated upon a reduction in brake pipe pressure to first move said auxiliary slide valve relatively to said main slide valve and then move said main slide valve to application position, said main slide valve being movable relatively to said piston and auxiliary slide valve beyond application position, said auxiliary slide valve closing communication from the valve chamber to said through port upon the last mentioned relative movement, said main slide valve having a transverse groove open at opposite ends to said valve chamber and separating a portion of the seating face of said main slide valve from the portion containing said cavity, and a through port in said main slide valve leading to the first mentioned portion of said main slide valve seating face and adapted to register with said passageway upon movement of said main slide valve beyond application position.

CLYDE C. FARMER.